United States Patent Office 3,484,480
Patented Dec. 16, 1969

3,484,480
PROCESS FOR SEPARATING ETHANE-1-HYDROXY-1,1-DIPHOSPHONIC ACID FROM A SOLUTION OF IT IN AN ORGANIC SOLVENT WHICH ALSO CONTAINS OXYACIDS OF PHOSPHORUS
Philip Pflaumer, Colerain Township, Hamilton County, and Julius P. Filcik, Cincinnati, Ohio, assignors to The Procter & Gamble Company, Cincinnati, Ohio, a corporation of Ohio
No Drawing. Continuation-in-part of application Ser. No. 623,211, Mar. 15, 1967. This application Feb. 23, 1968, Ser. No. 707,490
Int. Cl. C07f 9/38
U.S. Cl. 260—502.4                9 Claims

ABSTRACT OF THE DISCLOSURE

Process for separating and recovering ethane-1-hydroxy-1,1-diphosphonic acid from a solution of it in an organic solvent which also contains oxyacids of phosphorus which comprises adding to the solution an alkali metal or ammonium ion to convert the ethane-1-hydroxy-1,1-diphosphonic acid to a monobasic salt which is insoluble in the organic solvent and recoverable in a crystalline form.

This application is a continuation-in-part application of Ser. No. 623,211, filed Mar. 15, 1967, by Phillip F. Pflaumer and Julius P. Filcik.

BACKGROUND OF THE INVENTION

Ethane-1-hydroxy-1,1-diphosphonic acid compounds are valuable builders for use in detergent compositions as described in U.S. Patent 3,159,581. Several reactions are known for preparing such compounds. According to most of them, ethane-1-hydroxy-1,1-diphosphonic acid is prepared by a reaction which also results in the formation of substantial amounts of oxyacids of phosphorus such as orthophosphoric acid, orthophosphorous acid, and minor amounts of hypophosphorous acid. As a result, a reaction mixture is obtained which contains the desired ethane-1-hydroxy-1,1-diphosphonic acid in admixture with other by-products, e.g., oxyacids of phosphorus, together with an organic solvent and/or water if employed in the reaction or formed thereby. Separation and recovery of substantially all or even a major proportion of the ethane-1-hydroxy-1,1-diphosphonic acid from such mixtures has proved to be difficult.

The problems involved in separating and recovering ethane-1-hydroxy-1,1-diphosphonic acid in high yields and pure forms are described more fully in the following pending patent applications: (1) patent application Ser. No. 561,574, filed June 29, 1966, by Lawrence Rogovin et al., titled "Process for the Recovery of Substantially Pure Ethane-1-Hydroxy-1,1-Diphosphonic Acid Monohydrate"; (2) patent application Ser. No. 566,482, filed July 20, 1966, by David D. Whyte et al., titled "Process for Preparing Chemical Compounds Containing Trivalent Phosphorus"; and (3) patent application Ser. No. 554,134, filed May 31, 1966, by Phillip F. Pflaumer et al., titled "Process for Preparing Hydroxydiphosphonic Acids From Elemental Phosphorus and Carboxylic Acids" and now U.S. Patent 3,400,150. The organic reaction solutions prepared by these processes typically result in ethane-1-hydroxy-1,1-diphosphonic acid being present in admixture with substantial amounts of orthophosphoric acid together with an organic solvent, e.g., acetic acid, and water. Orthophosphorous acid may also be present but in lesser amounts than orthophosphoric acid. Separation and recovery of substantially pure ethane-1-hydroxy-1,1-diphosphonic acid from such a mixture is a preferred embodiment of the present invention.

Ethane-1-hydroxy-1,1-diphosphonic acid can be prepared by a reaction between phosphorus trichloride and acetic acid and/or water. An equivalent preparative method involves reacting acetyl chloride and phosphorous acid. In addition, phosphorous acid reacted with acetic anhydride also results in the formation of ethane-1-hydroxy-1,1-diphosphonic acid. A typical sample of ethane-1-hydroxy-1,1-diphosphonic acid from these reactions, however, contains considerable amounts of phosphite compounds.

Heretofore, it has been found virtually impossible to separate and recover pure ethane-1-hydroxy-1,1-diphosphonic acid in high yields from the reaction mixtures described above. While the exact reason is not known, the recovery problem is thought to be caused by interfering solubilization effects of the oxyacids of phosphorus, especially orthophosphoric acid and orthophosphorous acids.

Besides being incapable of recovering ethane-1-hydroxy-1,1-diphosphonic acid in pure form, known separation procedures are also unsatisfactory in other respects. For instance, known separation processes involving crystallization are inordinately slow, requiring up to several days to recover even a major proportion of the available ethane-1-hydroxy-1,1-diphosphonic acid. Most importantly there is no known technique for recovering ethane-1-hydroxy-1,1-diphosphonic acid in sufficiently pure form to render it most useful for its many uses including detergency builders and physiological applications. In the latter applications even minor amounts of phosphate and phosphite salts are undesirable.

The present invention, therefore, represents a valuable discovery because it solves the aforementioned separation and recovery problem and provides for the first time a process for providing ethane-1-hydroxy-1,1-diphosphonic acid in high yields, e.g., greater than 75%, and substantially pure forms even up to about 100% purity. A special advantage of this invention is its simplicity and its application to large-scale operations.

SUMMARY OF THE INVENTION AND PREFERRED EMBODIMENTS

In its broadest terms, the present invention is concerned with the separation and recovery of ethane-1-hydroxy-1,1-diphosphonic acid in high yields and substantially pure form from a mixture of it and oxyacids of phosphorus. The term oxyacids of phosphorus denotes orthophosphoric acid, orthophosphorous acid, hypophosphorous acid and mixtures of these acids.

As noted above, the ethane-1-hydroxy-1,1-diphosphonic acid-containing mixture can be prepared by any manner since the present invention is not limited in this respect. For example, the invention can be usefully applied to any of the reaction solutions described above for the primary purpose of separating and recovering the ethane-1-hydroxy-1,1-diphosphonic acid in substantially pure form and in heretofore unattainable high yields. In addition, the invention can be usefully applied to separate ethane-1-hydroxy-1,1-diphosphonic acid from even relatively low levels of oxyacids of phosphorus (e.g., phosphates, phosphites) with which it may be in admixture, in solution or solid form.

Accordingly, the present invention contemplates a starting solution containing the desired ethane-1-hydroxy-1,1-diphosphonic acid, at least one oxyacid of phosphorus, an organic solvent as defined below and, preferably water. The essential conditions are now described in detail below.

The starting solution is provided by an organic solvent in which both the ethane-1-hydroxy-1,1-diphosphonic acid and the oxyacids of phosphorus are soluble. An essential characteristic of the organic solvent is that a monobasic salt of ethane-1-hydroxy-1,1-diphosphonic acid must be substantially insoluble in it.

It has been discovered that suitable organic solvents which possess these necessary characteristics are formic acid, acetic acid, and aliphatic alcohol containing up to about 8 carbon atoms. The aliphatic alcohols can be methanol, ethanol, propanol, butanol, 4-chlorobutanol, pentanol, hexanol, heptanol, octanol, and the like. The preferred organic solvent is acetic acid.

The molar proportion of the organic solvent relative to the ethane-1-hydroxy-1,1-diphosphonic acid in the starting solution should be from about 1 to about 70 moles of organic solvent per each mole of ethane-1-hydroxy-1,1-diphosphonic acid. Preferably, the starting solution should contain from about 3 to about 15 moles of the organic solvent per each mole of ethane-1-hydroxy-1,1-diphosphonic acid.

Recognizing that the primary objective of this invention is to draw away the desired ethane-1-hydroxy-1,1-diphosphonic acid from oxyacids of phosphorus dissolved in an organic solvent and avoid any possible interfering solubilization effects of the oxyacids (e.g., orthophosphoric, orthophosphorous), the relative proportions of these ingredients can vary over a fairly wide range. The exact proportions will vary depending, of course, on the source of the ethane-1-hydroxy-1,1-diphosphonic acid-containing solution. The starting solution can contain from about .001 to about 17 moles of an oxyacid of phosphorus (this term also covers mixtures of orthophosphoric acid and orthophosphorous acid) per each mole of ethane-1-hydroxy-1,1-diphosphonic acid. Preferably, the solution should contain from about .005 to about 10 moles of an oxyacid of phosphorus per mole of ethane-1-hydroxy-1,1-diphosphonic acid. As mentioned, proportions can vary over these suitable ranges. As an illustration, reactions for preparing ethane-1-hydroxy-1,1-diphosphonic acid involving phosphorus trichloride and acetic acid and/or water, or phosphorous acid and acetic anhydride, form substantially no orthophosphoric acid and relatively small amounts of orthophosphorus acid. In these instances, the molar proportion of the orthophosphorus acid to ethane-1-hydroxy-1,1-diphosphonic acid is at the lower end of the aforementioned molar ranges. By the same token, in other reactions such as those described in the patent applications mentioned above, the molar proportion of the oxyacid of phosphorus (orthophosphoric acid) to ethane-1-hydroxy-1,1-diphosphonic acid tend to be somewhat higher in the prescribed range.

It has also been found preferable to have water present in the solution. This seems to have a beneficial effect upon the crystallization of the monobasic ethane-1-hydroxy-1,1-diphosphonic acid monohydrate both as to the rate with which it takes place and also the type of crystals which are formed. The amount of water present should be substantially equal to the amount of ethane-1-hydroxy-1,1-diphosphonic acid on a molar basis plus from about 0 to about 20% by weight of the organic solvent, preferably from about 3% to about 14% by weight of the organic solvent. As mentioned above, the presence of water appears to expedite the formation of monobasic ethane-1-hydroxy-1,1-diphosphonate monohydrate crystals. Moreover, the crystals eventually recovered appear to be firmer and crisper than those formed in the absence of water.

The temperature of the starting solution should be in the range of from about 30° F. to about 300° F., and preferably from about 50° F. to about 275° F.

In order to initiate the separation and recovery crystallization procedure of the present invention, an alkali metal or ammonium ion is added to the solution in which the ethane-1-hydroxy-1,1-diphosphonic acid and the oxyacid of phosphorus are dissolved in the organic solvent. The alkali metal ion can be either sodium, potassium, lithium or ammonium. While ammonium is not technically an alkali metal, it has basic properties and resembles an alkali metal radical so that it frequently is classified together with alkali metal radicals. For purposes of this description, therefore, the term "alkali metal ion" is used to include an ammonium ion since it provides satisfactory results in the practice of this invention. The preferred alkali metal ion is sodium, although lithium ion also performs satisfactorily. Potassium ions can likewise be used but are less preferred.

The alkali metal ion can be introduced to the solution in any of several forms with illustrative examples being sodium hydroxide, sodium oxide, sodium carbonate, sodium bicarbonate, a sodium salt of a carboxylic acid such as an alkanoic acid containing up to about 6 carbon atoms. Representative of this last category are sodium acetate, sodium formate, sodium propionate, sodium butanoate, sodium pentanoate, sodium hexanoate and the like. Corresponding lithium, potassium, and ammonium salts can also be used.

The amount of alkali metal ion added should be in the range of from about .75 to 1.2 moles of alkali metal ion per mole of ethane-1-hydroxy-1,1-diphosphonic acid dissolved in solution. If less than .75 mole of alkali metal is added, a considerable amount of available ethane-1-hydroxy-1,1-diphosphonic acid is lost in the separation process. If amounts larger than 1.2 moles of alkali metal ion are added, the result is that a substantial amount of any oxyacid of phosphorus may be converted to a salt which may then also tend to crystallize and separate out. This would be undesirable and would offset one of the primary objectives of this invention which is to separate and recover substantially all of the available ethane-1-hydroxy-1,1-diphosphonic acid as pure ethane-1-hydroxy-1,1-diphosphonic acid free of any salts of oxyacids of phosphorus, e.g., sodium phosphate or sodium phosphite. A preferred embodiment is to add from about 1.0 to about 1.1 moles of alkali metal ion per each mole of ethane-1-hydroxy-1,1-diphosphonic acid dissolved in the organic solvent.

While the present invention is not fully understood, what is believed to occur upon introduction of the alkali metal to the solution is that the alkali metal ion reacts with ethane-1-hydroxy-1,1-diphosphonic acid to form a monobasic salt of ethane-1-hydroxy-1,1-diphosphonic acid which is substantially insoluble in the organic solvent. The insoluble monobasic salt precipitates and separates out of solution. The precipitate formation or crystallization is promoted when water is present in the solution in the quantities previously specified. Crystal formation can be observed in only a few minutes, i.e., crystallization begins to take place almost immediately and is usually complete in less than 1 hour. Only infrequently are more than about 10 hours required for the separation to be completed. Longer times up to 24 hours and higher can be used if desired. Since the emphasis in a commercially acceptable reaction is on an increased rate of recovery of the desired product, water should be present in the amounts previously specified.

The monobasic ethane-1-hydroxy-1,1-diphosphonic acid crystals can be separated and recovered by any means such as filtration, centrifugation, and the like. Following recovery, the monobasic ethane-1-hydroxy-1,1-diphosphonic acid salt can be further neutralized to a higher salt form, such as trisodium ethane-1-hydroxy-1,1-diphosphonic acid by addition of a suitable basic reagent, e.g., sodium hydroxide, and the like.

The specific crystallized final product which is recovered depends upon which alkali metal ion is added. If a sodium ion is used, the crystallized product which forms and separates is monosodium ethane-1-hydroxy-1,1-diphosphonate. If ammonium, potassium or lithium salts are used, the corresponding salts are formed.

The invention is illustrated but not limited to the following examples:

EXAMPLE I

A mixture of 22.8 g. ethane-1-hydroxy-1,1-diphosphonic acid monohydrate (0.101 mole), 3.7 g. 85% orthophosphoric acid $H_3PO_4$ (.032 mole), and 48.1 g. acetic acid (.802 mole) was prepared and heated to about 200° F. to obtain a homogeneous solution which was mildly stirred. The total amount of water in the solution was 2.52 g. (.14 mole). 8.2 g. of sodium acetate (0.1 mole) were added to the solution and the mixture was allowed to cool with continued gentle stirring. After one hour the temperature had dropped to about 100° F. and crystals were observed to be forming. The solution was stored at 80° F. overnight (approximately 18 hours), at which time a large crop of crystals was present. The crystals were filtered out and washed twice with 25 ml. quantities of acetic acid followed by two washes with 25 ml. of ethyl ether. The weight of the dried cake was 23.7 g. (0.965 mole) and H' and $P^{31}NMR$ analysis showed it to be more than 99% monosodium ethane-1-hydroxy-1,1-diphosphonic acid monohydrate, $$CH_3C(OH)(PO_3)_2H_3Na \cdot H_2O$$

Less than 1% $H_3PO_4$ was found. The acetic acid filtrate and washes were combined and analyzed by $P^{31}NMR$ and found to contain 94 mole percent $H_3PO_4$ and 6 mole percent ethane-1-hydroxy-1,1-diphosphonic acid. Thus, 95.5% of the ethane-1-hydroxy-1,1-diphosphonic acid input was recovered in substantially pure form and the balance of the remaining ethane-1-hydroxy-1,1-diphosphonic acid was readily accounted for by losses on the glassware used.

In this example, equally good results can be obtained by replacing the acetic acid in the starting solution with equal proportions of formic acid, methanol, ethanol, or propanol.

The sodium acetate can be replaced with equimolar amounts sodium oxide, sodium hydroxide, sodium carbonate.

EXAMPLE II

A solution consisting of 0.101 mole ethane-1-hydroxy-1,1-diphosphonic acid monohydrate, 0.034 mole $H_3PO_4$, 0.805 mole acetic acid, and 0.14 mole water was prepared by mixing and heating at 200° F. To this solution was added 0.10 mole sodium hydroxide. The solution was allowed to stir gently overnight at about 80° F. for about 18 hours. A large crop of crystals formed. The crystals were filtered out and washed two times with 25 ml. lots of acetic acid followed by two rinses with ethyl ether. The weight of the dried cake was 24.2 g., and $P^{31}NMR$ analysis showed it to be pure monosodium ethane-1-hydroxy-1,1-diphosphonic acid monohydrate $$CH_3C(OH)(PO_3)_2H_3Na \cdot H_2O$$

Thus, 98% of the ethane-1-hydroxy-1,1-diphosphonic acid fed was recovered in this process.

EXAMPLE III

A solution consisting of 0.10 mole ethane-1-hydroxy-1,1-diphosphonic acid, 0.31 mole $H_3PO_4$, 0.80 mole acetic acid, and 0.39 mole water was prepared. This quantity of water was used so that after crystallization of monosodium salt of ethane-1-hydroxy-1,1-diphosphonic acid-monohydrate was complete, the remaining solvent would be about 10 weight percent water and 90 weight percent acetic acid. In preparing the solution the mixture was heated to about 200° F., and 0.1 mole of sodium acetate was added while the mixture was gently stirred. The sodium acetate was observed to dissolve, and then after about a minute, crystallization began and appeared to be complete in about 3 minutes. After filtering, washing, and drying the cake was found to contain 24.2 g. of $$CH_3C(OH)(PO_3)_2H_3Na \cdot H_2O$$

corresponding to a 98% recovery.

EXAMPLE IV

A solution was prepared as in Example III with the exception that it contains 0.245 mole water so that the final solvent would be about 95 weight percent acetic acid and 5 weight percent water. Again sodium acetate was added to the solution at about 200° F. and again crystallization appeared to be complete in about 7 minutes. After filtering, washing, and drying the cake weight was found to be 24.7 g. and $P^{31}NMR$ analysis revealed that the recovered crystals were virtually 100% monosodium ethane-1-hydroxy-1,1-diphosphonic acid monohydrate. Thus, virtually 100% of the ethane-1-hydroxy-1,1-diphosphonic acid was recovered by this process.

EXAMPLE V

A solution was prepared contained 30 g. ethane-1-hydroxy-1,1-diphosphonic acid (0.146 mole), 10 g. orthophosphoric acid (0.102 mole) dissolved in 50.4 g. acetic acid (.84 mole). The total amount of water present was 5.7 g. The solution was heated to about 200° F. to obtain a homogeneous solution which was mildly stirred.

The solution cooled to about 104° F. and 13.1 g. of sodium acetate (.160 mole) were added. Crystals were observed to be forming shortly after addition of the sodium acetate. After about 15 minutes at a temperature of about 100° F. the crystals were filtered out and washed twice with 25 ml. quantities of acetic acid followed by two washes with 25 ml. of ethyl ether. The weight of the dried cake was 32.1 g. and $P^{31}NMR$ analysis proved it to be substantially 100% monosodium ethane-1-hydroxy-1,1-diphosphonic acid monohydrate (.130 mole).

The acetic acid filtrate and washes were combined and analyzed by $P^{31}NMR$ and found to contain 93.5 mole percent orthophosphoric acid ($H_3PO_4$), and 6.5 mole percent ethane-1-hydroxy-1,1-diphosphonic acid. Thus about 89% of the ethane-1-hydroxy-1,1-diphosphonic acid input was recovered in substantially pure form and the balance of the remaining ethane-1-hydroxy-1,1-diphosphonic acid was readily accounted for.

EXAMPLE VI

Following the procedure described in Example V, a solution was prepared containing 10 g. ethane-1-hydroxy-1,1-diphosphonic acid (0.049 mole), 10 g. orthophosphoric acid (0.102 mole) dissolved in 76.8 g. acetic acid (1.28 mole). The total amount of water present was 5.1 g. The solution was heated to about 200° F. to obtain a homogeneous solution which was mildly stirred.

The solution cooled to about 104° F. and 4.38 g. of sodium acetate (.054 mole) were added. Crystals were observed to be forming shortly after addition of the sodium acetate. After about 3 hours at a temperature of about 86° F. the crystals were filtered out and washed twice with 25 ml. quantities of acetic acid followed by two washes with 25 ml. of ethyl ether. The weight of the dried cake was 8.6 g. and $P^{31}NMR$ analysis provided it to be substantially 100% monosodium ethane-1-hydroxy-1,1-diphosphonic acid monohydrate (.035 mole).

The acetic acid filtrate and washes were combined and analyzed by $P^{31}NMR$ and found to contain 92.9 mole percent orthophosphoric acid ($H_3PO_4$), and 7.1 mole percent ethane-1,1 - diphosphonic acid. Thus about 71% of the ethane-1-hydroxy-1,1-diphosphonic acid input was recovered in substantially pure form and the balance of the remaining ethane-1-hydroxy-1,1-diphosphonic acid was readily accounted for.

EXAMPLE VII

Following the procedure described in Example V, a solution was prepared containing 60 g. ethane-1-hydroxy-1,1-diphosphonic acid (0.102 mole) and 10 g. orthophosphoric acid (.102 mole) dissolved in 10.8 g. acetic acid (.18 mole). The total amount of water present was 7.3 g. The solution was heated to about 200° F.

to obtain a homogeneous solution which was mildly stirred.

The solution cooled to about 104° F. and 26.3 g. of sodium acetate (.321 mole) were added. Crystals were observed to be forming shortly after addition of the sodium acetate. After about 10 minutes at a temperature of about 123° F. the crystals were filtered out and washed twice with 25 ml. quantities of acetic acid followed by two washes with 25 ml. of ethyl ether. The weight of the dried cake was 32.1 g. and $P^{31}$NMR analysis proved it to be substantially 100% monosodium ethane-1-hydroxy-1,1-diphosphonic acid monohydrate (.262 mole).

The acetic acid filtrate and washes were combined and analyzed by $P^{31}$NMR and found to contain 92.9 mole percent orthophosphoric acid ($H_3PO_4$), and 7.1 mole percent ethane-1-hydroxy-1,1-diphosphonic acid. Thus about 90% of the ethane-1-hydroxy-1,1-diphosphonic acid input was recovered in substantially pure form and the balance of the remaining ethane-1-hydroxy-1,1-diphosphonic acid was readily accounted for.

EXAMPLE VIII

A solution was prepared containing 30 g. ethane-1-hydroxy-1,1-diphosphonic acid (0.146 mole), 30 g. orthophosphoric acid (.306 mole) dissolved in 30.4 g. acetic acid (.51 mole). The total amount of water present was 8.2 g. The solution was heated to about 200° F. to obtain a homogeneous solution which was mildly stirred.

The solution cooled to about 104° F. and 13.1 g. of sodium acetate (.160 mole) were added. Crystals were observed to be forming shortly after addition of the sodium acetate. After about 20 hours at a temperature of about 68° F. the crystals were filtered out and washed twice with 25 ml. quantities of acetic acid followed by two washes with 25 ml. of ethyl ether. The weight of the dried cake was 27.3 g. and $P^{31}$NMR analysis proved it to be substantially 100% monosodium ethane-1-hydroxy-1,1-diphosphonic acid monohydrate (.111 mole).

The acetic acid filtrate and washes were combined and analyzed by $P^{31}$NMR and found to contain 93.2 mole percent orthophosphoric acid ($H_3PO_4$), and 6.8 mole percent ethane-1-hydroxy-1,1-diphosphonic acid. Thus about 76% of the ethane-1-hydroxy-1,1-diphosphonic acid input was recovered in substantially pure form and the balance of the remaining ethane-1-hydroxy-1,1-diphosphonic acid was readily accounted for.

EXAMPLE IX

A solution was prepared containing 45 g. ethane-1-hydroxy-1,1-diphosphonic acid monohydrate (.218 mole), 15 g. orthophosphoric acid (.153 mole) and 10 g. orthophosphorous acid (.122 mole) dissolved in 25.7 g. acetic acid (.43 mole). The total amount of water present was 5.6 g. The solution was heated to about 200° F. to obtain a homogeneous solution which was mildly stirred.

The solution cooled to about 95° F. and 19.6 g. of sodium acetate (.239 mole) were added. Crystals were observed to be forming shortly after addition of the sodium acetate. After about 90 minutes at a temperature of about 100° F. the crystals were filtered out and washed twice with 25 ml. quantities of acetic acid followed by two washes with 25 ml. of ethyl ether. The weight of the dried cake was 44.9 g. and $P^{31}$NMR analysis proved it to be substantially 100% monosodium ethane-1-hydroxy-1,1-diphosphonic acid monohydrate (.182 mole).

The acetic acid filtrate and washes were combined and analyzed by $P^{31}$NMR. It was found that about 84% of the ethane-1-hydroxy-1,1-diphosphonic acid input was recovered in substantially pure form.

EXAMPLE X

A solution was prepared containing 30 g. ethane-1-hydroxy-1,1-diphosphonic acid monohydrate (0.146 mole), 10 g. orthophosphoric acid (0.102 mole), 10 g. orthophosphorus acid (.122 mole) dissolved in 50.4 g. acetic acid (.84 mole). The total amount of water present was 5.4 g. The solution was heated to about 200° F. to obtain a homogeneous solution which was mildly stirred.

The solution cooled to about 95° F. and 13.1 g. of sodium acetate (.160 mole) were added. Crystals were observed to be forming shortly after addition of the sodium acetate. After about 30 minutes at a temperature of about 131° F. the crystals were filtered out and washed twice with 25 ml. quantities of acetic acid followed by two washes with 25 ml. of ethyl ether. The weight of the dried cake was 31.5 g. and $P^{31}$NMR analysis proved it to be substantially 100% monosodium ethane-1-hydroxy-1,1-diphosphonic acid monohydrate (.128 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XI

A solution was prepared containing 30 g. ethane-1-hydroxy-1,1-diphosphonic acid (0.146 mole), 10 g. orthophosphoric acid (0.102 mole) dissolved in 60 g. methanol (1.87 mole). The total amount of water present was 4.5 g. The solution was heated to about 200° F. to obtain a homogeneous solution which was mildly stirred.

The solution cooled to about 104° F. and 12 g. of 50% sodium hydroxide (.152 mole) were added. Crystals were observed to be forming shortly after addition of the sodium hydroxide. After about 3 hours at a temperature of about 72° F., the crystals were filtered out and washed twice with 25 ml. quantities of methanol followed by two washes with 25 ml. of ethyl ether. The weight of the dried cake was 33.8 g. and $P^{31}$NMR analysis proved it to be 99% monosodium ethane-1-hydroxy-1,1-diphosphonic acid monohydrate (.137 mole) and 1% orthophosphoric acid.

The methanol filtrate was analyzed by $P^{31}$NMR. It was found that about 94% of the ethane-1-hydroxy-1,1-diphosphonic acid input was recovered in substantially pure form.

EXAMPLE XII

A solution was prepared containing 30 g. ethane-1-hydroxy-1,1-diphosphonic acid (0.146 mole), 10 g. orthophosphoric acid (0.102 mole) dissolved in 60 g. ethanol (1.3 moles). The total amount of water present was 4.5 g. The solution was heated to about 200° F. to obtain a homogeneous solution which was mildly stirred.

The solution cooled to about 95° F. and 12 g. of 50% sodium hydroxide (.152 mole) were added. Crystals were observed to be forming shortly after addition of the sodium hydroxide. After about 10 minutes at a temperature of about 136° F. the crystals were filtered out and washed twice with 25 ml. quantities of ethanol followed by two washes with 25 ml. of ethyl ether. The weight of the dried cake was 34.3 g. and $P^{31}$NMR analysis proved it to be 95% monosodium ethane-1-hydroxy-1,1-diphosphonic acid monohydrate (.139 mole) and 5% orthophosphoric acid.

The ethanol filtrate was analyzed by $P^{31}$NMR. It was found that about 95% of the ethane-1-hydroxy-1,1-diphosphonic acid input was recovered in substantially pure form.

EXAMPLE XIII

A solution was prepared containing 30 g. ethane-1-hydroxy-1,1-diphosphonic acid (0.146 mole), 10 g. orthophosphoric acid (0.102 mole) dissolved in 60 g. isopropanol (1.0 mole). The total amount of water present was 4.5 g. The solution was heated to about 200° F. to obtain a homogeneous solution which was mildly stirred.

The solution cooled to about 104° F. and 12 g. of 50% sodium hydroxide (.152 mole) were added. Crystals were observed to be forming shortly after addition of the sodium hydroxide. After about 2 hours at a temperature of about 72° F. the crystals were filtered out and washed twice with 25 ml. quantities of isopropanol followed by two washes with 25 ml. of ethyl ether. The weight of the dried cake was 37.1 g. and $P^{31}$NMR analysis proved to be substantially 100% monosodium ethane-1-hydroxy-1,1-disphosphonic acid monohydrate.

The isopropanol filtrate was analyzed by $P^{31}$NMR. It was found that about 100% of the ethane-1-hydroxy-1,1-diphosphoric acid input was recovered in substantially pure form.

EXAMPLE XIV

A solution was prepared containing 30 g. ethane-1-hydroxy-1,1-diphosphonic acid (0.146 mole), 10 g. orthophosphoric acid (0.102 mole) dissolved in 60 g. n-butanol (1.0 mole). The total amount of water present was 4.5 g. The solution was heated to about 200° F. to obtain a homogeneous solution which was mildly stirred.

The solution cooled to about 113° F. and 12 g. of 50% sodium hydroxide (.152 mole) were added. Crystals were observed to be forming shortly after addition of the sodium hydroxide. After about 2 hours at a temperature of about 72° F. the crystals were filtered out and washed twice with 25 ml. quantities of n-butanol followed by two washes with 25 ml. of ethyl ether. The weight of the dried cake was 36 g. and $P^{31}$NMR analysis proved it to be substantially 98% monosodium ethane-1-hydroxy-1,1-diphosphonic acid monohydrate (.143 mole).

The n-butanol filtrate was analyzed by $P^{31}$NMR. It was found that about 98% of the ethane-1-hydroxy-1,1-diphosphoric acid input was recovered in substantially pure form.

EXAMPLE XV

A solution was prepared containing 30 g. ethane-1-hydroxy-1,1-diphosphonic acid (0.146 mole), 10 g. orthophosphoric acid (0.102 mole) dissolved in 60 g. n-hexanol (.68 mole). The total amount of water present was 4.5 g. The solution was heated to about 200° F. to obtain a homogeneous solution which was mildly stirred.

The solution cooled to about 131° F. and 12 g. of 50% sodium hydroxide (.152 mole) were added. Crystals were observed to be forming shortly after addition of the sodium hydroxide. After about 2 hours at a temperature of about 72° F. the crystals were filtered out and washed twice with 25 ml. quantities of n-hexanol followed by two washes with 25 ml. of ethyl ether. The weight of the dried cake was 35.8 g. and $P^{31}$NMR analysis proved it to be substantially 97% monosodium ethane-1-hydroxy-1,1-disphosphonic acid monohydrate (.141 mole) and 3% orthophosphoric acid.

The n-hexanol filtrate was analyzed by $P^{31}$NMR. It was found that about 97% of the ethane-1-hydroxy-1,1-diphosphonic acid input was recovered in substantially pure form.

EXAMPLE XVI

A solution is prepared containing 95 g. ethane-1-hydroxy-1,1-diphosphonic acid (.463 mole), 5 g. orthophosphorous acid (.063 mole), 400 g. acetic acid (6.67 moles), and 36 g. $H_2O$ (2.0 moles). To this mixture is added 41.8 g. sodium acetate (.509 mole) with stirring at 104° F. Crystals begin to form after about an hour. The resulting crystals are filtered and washed 2 times with 100 ml. aliquots of acetic acid and 3 times with 100 ml. aliquots of ethyl ether to give about 90% recovery of the ethane-1-hydroxy-1,1-diphosphonic acid with greater than 99% purity.

In the following examples, XVII to XXII, reaction solutions were prepared containing ethane-1-hydroxy-1,1-diphosphonic acid, according to the procedure described in the aforementioned patent application Ser. No. 554,134, filed May 31, 1966, by Phillip F. Pflaumer et al., titled "Process for Preparing Hydroxydiphosphonic Acid From Elemental Phosphorus and Carboxylic Acids."

According to this process, the procedure in general terms of preparing ethane-1-hydroxy-1,1-diphosphonic acid comprises the steps of preparing a dispersion of elemental phosphorus in an organic medium containing acetic acid, oxidizing the elemental phosphorus to an anhydride of trivalent phopshorus in situ by introducing an oxidizing gas into said dispersion with vigorous mixing, reacting said anhydride of trivalent phosphorus and said carboxylic acid to form a reaction mixture containing phosphite intermediate compounds, digesting the reaction mixture for a period of from about 1 minute to about 4 hours at a temperature in the range of from about 70° C. to about 170° C. thereby converting said phosphite intermediate compounds to compounds containing carbon atoms bonded directly to phosphorus atoms, and hydrolyzing said compounds containing a carbon atom bonded directly to phosphorus atoms to form ethane-1-hydroxy-1,1-diphosphonic acid. By employing this procedure, 100 g. of yellow phosphorus were dispersed in 670 g. of acetic acid, oxygen was introduced at a rate of about 5 g. per minute to form a reaction mixture. Two such runs were conducted and the two reaction mixtures were combined. Following a digestion step of about 30 minutes a hydrolysis reaction and additional work-up the combined reaction solution was separated into 6 portions and each portion was then subjected to the practice of the present invention to separate and recover substantially pure ethane-1-hydroxy-1,1-diphosphonic acid.

EXAMPLE XVII

A reaction solution containing 74 g. ethane-1-hydroxy-1,1-diphosphonic acid (.36 mole), 25 g. orthophosphoric acid (.26 mole), and 1.6 g. orthophosphorous acid (.02 mole) dissolved in 188 g. acetic acid (3.1 moles) was prepared as described above. The total amount of water present was 33 g.

The temperature was adjusted to about 190° F. and 15 g. of sodium hydroxide (.376 mole) were added. Crystals were observed to be forming shortly after addition of the sodium hydroxide. After about 11 minutes at a temperature of about 212° F. the crystals were filtered out and washed twice with acetic acid followed by two washes with ethyl ether. The weight of the dried cake was 80.4 g. and $P^{31}$NMR analysis proved it to be substantially 100% monosodium ethane-1-hydroxy-1,1-diphosphonic acid monohydrate (.326 mole).

The acetic acid filtrate and washes were combined and analyzed by $P^{31}$NMR. It was found that about 90% of the ethane-1-hydroxy-1,1-diphosphonic acid input was recovered in substantially pure form.

EXAMPLE XVIII

A reaction solution was prepared as described above containing 74 g. ethane-1-hydroxy-1,1-diphosphonic acid (.36 mole), 25 g. orthophosphoric acid (.26 mole) and 1.6 g. orthophosphorous acid (.02 mole) dissolved in 188 g. acetic acid (3.1 moles). The total amount of water present was 33 g.

The temperature was adjusted to about 77° F. and 15 g. of sodium hydroxide (.376 mole) were added. Crystals were observed to be forming shortly after addition of the sodium hydroxide. After about 25 minutes at a temperature of about 140° F. the crystals were filtered out and washed twice with acetic acid followed by two washes with ethyl ether. The weight of the dried cake was 81.5 g. and $P^{31}$NMR analysis proved it to be substantially 100% monosodium ethane-1-hydroxy-1,1 - diphosphonic acid monohydrate (.331 mole).

The acetic acid filtrate and washes were combined and analyzed by $P^{31}$NMR. It was found that about 92% of the ethane-1-hydroxy-1,1-diphosphonic acid input was recovered in substantially pure form.

EXAMPLE XIX

A reaction solution was prepared as described above containing 74 g. ethane-1-hydroxy-1,1-diphosphonic acid (.36 mole), 25 g. orthophosphoric acid (.26 mole) and 1.6 g. orthophosphorous acid (.02 mole) dissolved in 188 g. acetic acid (3.1 moles). The total amount of water present was 11 g.

The temperature was adjusted to about 154° F. and 30.8 g. of sodium acetate (.376 mole) were added. Crystals were observed to be forming shortly after addition of the sodium acetate. After about 3 hours at a temperature of about 160° F. the crystals were filtered out and washed twice with acetic acid followed by two washes with ethyl ether. The weight of the dried cake was 75.7 g. and $P^{31}$NMR analysis proved it to be substantially 100% monosodium ethane-1-hydroxy - 1,1 - diphosphonic acid monohydrate (.308 mole).

The acetic acid filtrate and washes were combined and analyzed by $P^{31}$NMR. It was found that about 86% of the ethane-1-hydroxy-1,1-diphosphonic acid input was recovered in substantially pure form.

EXAMPLE XX

A reaction solution was prepared as described above containing 74 g. ethane-1-hydroxy-1,1-diphosphonic acid (.36 mole), 25 g. orthophosphoric acid (.26 mole) and 1.6 g. orthophosphorous acid (.02 mole) dissolved in 188 g. acetic acid (3.1 moles). The total amount of water present was 11 g.

The temperature was adjusted to about 77° F. and 30.8 g. of sodium acetate (.376 mole) were added. Crystals were observed to be forming shortly after addition of the sodium acetate. After about 18 hours at a temperature of about 72° F. the crystals were filtered out and washed twice with acetic acid followed by two washes with ethyl ether. The weight of the dried cake was 78.4 g. and $P^{31}$NMR analysis proved it to be substantially 100% monosodium ethane-1-hydroxy - 1,1 - diphosphonic acid monohydrate (.318 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XXI

A reaction solution was prepared as described above containing 74 g. ethane-1-hydroxy-1,1-diphosphonic acid (.36 mole), 25 g. orthophosphoric acid (.26 mole) and 1.6 g. orthophoshorous acid (.02 mole) dissolved in 188 g. acetic acid (3.1 moles). The total amount of water present was 36 g.

The temperature was adjusted to about 79° F. and 30.8 g. of sodium acetate (.376 mole) were added. Crystals were observed to be forming shortly after addition of the sodium acetate. After about 10 minutes at a temperature of about 104° F. the crystals were filtered out and washed twice with acetic acid followed by two washes with ethyl ether. The weight of the dried cake was 83.6 g. and $P^{31}$NMR analysis proved it to be substantially 100% monosodium ethane-1-hydroxy - 1,1 - diphosphonic acid monohydrate (.34 mole).

The acetic acid filtrate and washes were combined and analyzed by $P^{31}$NMR. It was found that about 94% of the ethane-1-hydroxy-1,1 - diphosphonic acid input was recovered in substantially pure form.

EXAMPLE XXII

A reaction solution was prepared as described above containing 37 g. ethane-1-hydroxy-1,1-diphosphonic acid (.18 mole), 13.5 g. orthophosphoric acid (.13 mole) and 0.8 g. orthophosphorous acid (0.1 mole) dissolved in 94 g. acetic acid (1.6 moles). The total amount of water present was 10.5 g.

The temperature of the solution was adjusted to about 79° F. and 15.4 g. of sodium acetate (.188 mole) were added. Crystals were observed to be forming shortly after addition of the sodium acetate. After about 37 minutes at a temperature of about 95° F. the crystals were filtered out and washed twice with acetic acid followed by two washes with ethyl ether. The weight of the dried cake was 40.3 g. and $P^{31}$NMR analysis proved it to be substantially 100% monosodium ethane-1-hydroxy-1,1 - diphosphonic acid monohydrate (.164 mole).

The acetic acid filtrate and washes were combined and analyzed by $P^{31}$NMR. It was found that about 91% of the ethane-1-hydroxy-1,1-diphosphonic acid input was recovered in substantially pure form.

Examples XXIII to XXIX are based on the recovery of pure ethane-1-hydroxy-1,1-diphosphonic acid from another reaction mixture prepared in substantially the same manner as that employed in Examples XVII to XXII. As before, 100 g. of yellow phosphorus were dispersed in 670 g. of acetic acid, and oxygen was passed into the dispersion to form a reaction mixture. The procedure was repeated and the second reaction mixture was combined with the first. The combined reaction mixtures were then digested, and hydrolyzed. The resulting reaction solution was separated into 8 portions and each portion was subjected to the practice of the present invention to separate and recover substantially pure ethane-1-hydroxy-1,1-diphosphonic acid.

EXAMPLE XXIII

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 115 g. acetic acid (1.9 mole). The total amount of water present was 13.7 g.

The temperature of the solution was adjusted to about 82° F. and 19.3 g. of sodium acetate (.235 mole) were added. Crystals were observed to be forming shortly after addition of the sodium acetate. After about 11 minutes at a temperature of about 108° F. the crystals were filtered out and washed twice with acetic acid followed by two washes with ethyl ether. The weight of the dried cake was 51.7 g. and $P^{31}$NMR analysis proved it to be substantially 100% monosodium ethane-1-hydroxy-1,1-diphosphonic acid monohydrate (.210 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XXIV

A reaction solution was prepared as described above containing 50 g. ethane-1-hydroxy-1,1-diphosphonic acid (.24 mole) 20 g. orthophosphoric acid (.20 mole) and 1.1 g. orthophosphorous acid (.014 mole) dissolved in 115 g. acetic acid (1.9 mole). The total amount of water present was 13.7 g.

The temperature of the solution was adjusted to about 82° F. and 20.2 g. of sodium acetate (.246 mole) were added. Crystals were observed to be forming shortly after addition of the sodium acetate. After about 60 minutes at a temperature of about 104° F. the crystals were filtered out and washed twice with acetic acid followed by two washes with ethyl ether. The weight of the dried cake was 52.1 g. and $P^{31}$NMR analysis proved it to be substantially 100% monosodium ethane-1-hydroxy-1,1-diphosphonic acid monohydrate (.212 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XXV

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 115 g. acetic acid (1.9 mole). The total amount of water present was 13.7 g.

The temperature of the solution was adjusted to about 82° F. and 21.2 g. of sodium acetate (.258 mole) were added. Crystals were observed to be forming shortly after addition of the sodium acetate. After about 25 minutes at a temperature of about 104° F. the crystals were filtered out and washed twice with acetic acid followed by two washes with ethyl ether. The weight of the dried cake was 53.3 g. and $P^{31}$NMR analysis proved it to be substantially 100% monosodium ethane-1-hydroxy-1,1-diphosphonic acid monohydrate (.216 mole).

The acetic acid filtrate and washes were combined and analyzed by $P^{31}$NMR. It was found that about 90% of the ethane-1-hydroxy-1,1-diphosphonic acid input was recovered in substantially pure form.

EXAMPLE XXVI

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 115 g. acetic acid (1.9 mole). The total amount of water present was 13.7 g.

The temperature of the solution was adjusted to about 82° F. and 23.1 g. of sodium acetate (.282 mole) were added. Crystals were observed to be forming shortly after addition of the sodium acetate. After about 20 minutes at a temperature of about 104° F. the crystals were filtered out and washed twice with acetic acid followed by two washes with ethyl ether. The weight of the dried cake was 51.8 g. and $P^{31}$NMR analysis proved it to be substantially 100% monosodium ethane-1-hydroxy-1,1-diphosphonic acid monohydrate (.211 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XXVII

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 108 g. acetic acid (1.8 moles). The total amount of water present was 20.5 g.

The temperature of the solution was adjusted to about 82° F. and 21.2 g. of sodium acetate (.258 mole) were added. Crystals were observed to be forming shortly after addition of the sodium acetate. After about 6 minutes at a temperature of about 106° F. the crystals were filtered out and washed twice with quantities of acetic acid followed by two washes with ethyl ether. The weight of the dried cake was 53.7 g. and $H^1$ and $P^{31}$NMR analysis proved it to be substantially 100% monosodium ethane-1-hydroxy-1,1-diphosphonic acid monohydrate (.218 mole).

The acetic acid filtrate and washes were combined and analyzed by $P^{31}$NMR. It was found that about 91% of the ethane-1-hydroxy-1,1-diphosphonic acid input was recovered in substantially pure form.

EXAMPLE XXVIII

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 95 g. acetic acid (1.6 moles). The total amount of water present was 34 g.

The temperature of the solution was adjusted to about 82° F. and 21.2 g. of sodium acetate (.258 mole) were added. Crystals were observed to be forming shortly after addition of the sodium acetate. After about 4 minutes at a temperature of about 106° F. the crystals were filtered out and washed twice with acetic acid followed by two washes with ethyl ether. The weight of the dried cake as 51.8 g. and $P^{31}$NMR analysis proved it to be substantially 100% monosodium ethane-1-hydroxy-1,1-diphosphonic acid monohydrate (.211 mole).

The acetic acid filtrate and washes were combined and analyzed by $P^{31}$NMR. It was found that about 88% of the ethane-1-hydroxy-1,1-diphosphonic acid input was recovered in substantially pure form.

EXAMPLE XXIX

A reaction solution was prepared as described above containing 50 g. ethane-1-hydroxy-1,1-diphosphonic acid (.24 mole), 20 g. orthophosphoric acid (.20 mole) and 1.1 g. orthophosphorous acid (.014 mole) dissolved in 115 g. acetic acid (1.9 moles). The total amount of water present was 13.7 g.

The temperature of the solution was adjusted to about 167° F. and 21.2 g. of sodium acetate (.258 mole) were added. Crystals were observed to be forming shortly after addition of the sodium acetate. After about 35 minutes at a temperature of about 158° F. the crystals were filtered out and washed twice with acetic acid followed by two washes with ethyl ether. The weight of the dried cake was 52.6 g. and $P^{31}$NMR analysis proved it to be substantially 100% monosodium ethane-1-hydroxy-1,1-diphosphonic acid monohydrate (.214 mole).

The acetic acid filtrate and washes were combined and analyzed by $P^{31}$NMR. It was found that about 89% of the ethane-1-hydroxy-1,1-diphosphonic acid input was recovered in substantially pure form.

EXAMPLE XXX

A reaction solution was prepared containing 216 g. ethane-1-hydroxy-1,1-diphosphonic acid monohydrate (1.05 moles), 111 g. orthophosphoric acid (1.13 moles) dissolved in 600 g. acetic acid (10.0 moles). The total amount of water present was 34 g. The temperature of the solution was adjusted to about 112° F. and 97.8 g. of sodium acetate (1.22 moles) were added. After about 64 minutes at a temperature of about 80° F. the crystals which had formed were filtered out and washed twice with acetic acid followed by two washes with ethyl ether. The weight of the dried cake was 205 g. and $H^1$ and $P^{31}$NMR analysis proved it to be substantially 99% monosodium ethane-1-hydroxy-1,1-diphosphonic acid monohydrate (.832 mole). The acetic acid filtrate and washes were combined and analyzed by $P^{31}$NMR and found that about 79% of the ethane-1-hydroxy-1,1-diphosphonic acid input was recovered in substantially pure form.

The foregoing description and examples describe and illustrate certain operable and preferred embodiments of the present invention. It is not intended that the invention should be so limited since variations and modifications thereof will be obvious to those skilled in the art, all of which are within the spirit and scope of this invention.

What is claimed is:

1. A process for separating ethane-1-hydroxy-1,1-diphosphonic acid from a solution of it in an organic solvent selected from the group consisting of acetic acid and formic acid which also has dissolved therein at least one oxyacid of phosphorus which comprises adding to said solution as an hydroxide, oxide, carbonate, bicarbonate, or salt of an alkanoic acid containing up to about 6 carbon atoms from about 0.75 to about 1.2 moles of an alkali metal or ammonium ion per each mole of ethane-1-hydroxy-1,1-diphosphonic acid to form a monobasic salt of ethane-1-hydroxy-1,1-diphosphonic acid which is insoluble in said organic solvent and which forms a precipitate, the proportion of said organic solvent to said ethane-1-hydroxy-1,1-diphosphonic acid being in the range of from about 1 to about 70 moles of said solvent per mole of said ethane-1-hydroxy-1,1-diphosphonic acid, said solution having a temperature in the range of from about 30° F. to about 300° F.

and, thereafter, separating said precipitate from the solution.

2. The process of claim 1 in which the alkali metal or ammonium ion is added in a range of from about 1.0 to about 1.1 moles per mole of ethane-1-hydroxy-1,1-diphosphonic acid.

3. The process of claim 1 in which the alkali metal is selected from the group consisting of sodium, potassium and lithium.

4. A process of claim 1 in which water is also present in the solution in an amount which is substantially equal to the amount of ethane-1-hydroxy-1,1-diphosphonic acid on a molar basis plus from about 0 to 20% by weight of the organic solvent.

5. The process of claim 1 in which the organic solvent is acetic acid.

6. The process of claim 1 in which the oxyacid of phosphrous is orthophosphoric acid, orthophosphorous acid, or hypophosphorous acid.

7. The process of claim 1 in which the molar proportion of the organic solvent to the ethane-1-hydroxy-1,1-diphosphonic acid is in the range of from about 3 to about 15 moles of said solvent per each mole of ethane-1-hydroxy-1,1-diphosphonic acid.

8. The process of claim 1 in which the solution prior to adding the alkali metal or ammonium ion contains from about .001 to about 17 moles of an oxyacid of phosphorus per each mole of ethane-1-hydroxy-1,1-diphosphonic acid.

9. The process of claim 8 in which the solution prior to adding the alkali metal or ammonium ion contains from about .005 to about 10 moles of an oxyacid of phosphorus per each mole of ethane-1-hydroxy-1,1-diphosphonic acid.

References Cited

UNITED STATES PATENTS

| 3,159,581 | 12/1964 | Diehl | 260—502.4 |
| 3,214,454 | 10/1965 | Blaser et al. | 260—502.4 |

FOREIGN PATENTS

| 978,297 | 12/1964 | Great Britain. |
| 1,148,235 | 5/1963 | Germany. |
| 1,148,552 | 5/1963 | Germany. |

LEON ZITVER, Primary Examiner

J. E. EVANS, Assistant Examiner

U.S. Cl. X.R.

23—165; 260—541, 542